United States Patent
Kim et al.

(10) Patent No.: US 10,154,475 B2
(45) Date of Patent: Dec. 11, 2018

(54) METHOD AND DEVICE FOR SELECTING RELAY IN WIRELESS COMMUNICATION SYSTEM

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/327,164

(22) PCT Filed: Aug. 10, 2015

(86) PCT No.: PCT/KR2015/008346
§ 371 (c)(1),
(2) Date: Jan. 18, 2017

(87) PCT Pub. No.: WO2016/024773
PCT Pub. Date: Feb. 18, 2016

(65) Prior Publication Data
US 2017/0164332 A1 Jun. 8, 2017

Related U.S. Application Data

(60) Provisional application No. 62/035,478, filed on Aug. 10, 2014, provisional application No. 62/035,479, filed on Aug. 10, 2014.

(51) Int. Cl.
*H04W 72/02* (2009.01)
*H04W 76/10* (2018.01)
(Continued)

(52) U.S. Cl.
CPC ......... *H04W 72/02* (2013.01); *H04W 40/246* (2013.01); *H04W 76/10* (2018.02); *H04W 8/005* (2013.01); *H04W 88/04* (2013.01)

(58) Field of Classification Search
CPC ... H04W 72/02; H04W 40/246; H04W 76/10; H04W 88/04; H04W 8/005
See application file for complete search history.

(56) References Cited

U.S. PATENT DOCUMENTS 9,584,985 B2 * 2/2017 Wu ........................ H04B 7/15
2015/0009908 A1 * 1/2015 Kalapatapu ......... H04L 12/6418
370/329

(Continued)

FOREIGN PATENT DOCUMENTS

WO  WO 2014/112834 A1  7/2014

OTHER PUBLICATIONS

Catt, "Supported Session Continuity Scenario," SA WG2 Meeting #104, S2-142595 (revision of S2-14xxxx), SA WG2 Temporary Document, Dublin, Ireland, Jul. 7-11, 2014 (Jul. 2, 2014), pp. 1-5.

(Continued)

*Primary Examiner* — Phuc Tran
(74) *Attorney, Agent, or Firm* — Birch, Stewart, Kolasch & Birch, LLP

(57) ABSTRACT

An embodiment of the present invention relates to a method of selecting, by a first UE, a relay in a proximity service (ProSe) in a wireless communication system, the method including the steps of transmitting a UE-to-Network Relay discovery message; selecting a second UE as the UE-to-Network Relay; setting a connection for direct communication with the second UE; and transmitting a registration request message to a group communication service application server (GCS AS) through the second UE, wherein when the UE-to-Network Relay discovery message includes UE- (Continued)

to-UE Relay related request information, the UE-to-UE Relay related information is received from the second UE and the second UE is selected as the UE-to-UE Relay based on the UE-to-UE relay related information.

11 Claims, 16 Drawing Sheets

(51) Int. Cl.
*H04W 40/24* (2009.01)
*H04W 8/00* (2009.01)
*H04W 88/04* (2009.01)

(56) References Cited

U.S. PATENT DOCUMENTS

| | | | | |
|---|---|---|---|---|
| 2015/0029866 | A1* | 1/2015 | Liao | H04W 4/008 370/241 |
| 2015/0327157 | A1* | 11/2015 | Al-Shalash | H04W 48/16 370/328 |
| 2016/0037568 | A1* | 2/2016 | Hakola | H04W 8/005 370/329 |
| 2016/0149876 | A1* | 5/2016 | Zhang | H04L 9/088 726/4 |
| 2016/0150373 | A1* | 5/2016 | Kim | H04B 7/026 455/456.3 |
| 2017/0078828 | A1* | 3/2017 | Watfa | H04W 4/005 |
| 2017/0164332 | A1* | 6/2017 | Kim | H04W 72/02 |

OTHER PUBLICATIONS

Intel, "Solution for ProSe UE-Network and ProSe UE-UE Relays," SA WG2 Meeting #104, S2-142611 (revision of SZ-14xxxx) SA WG2 Temporary Document, Dublin, Ireland. Jul. 7-11, 2014 (Jul. 2, 2014), pp. 1-7.

LG Electronics, "Clarification on ProSe UE Functionality," SA WG2 Meeting #104, S2-142813 (revision of S2-142568), Change Request, Dublin, Ireland, Jul. 7-11, 2014, 2 pages.

Renesas Mobile Europe Ltd., "Connection Setup via ProSe UE-to-UE Relay," SA WG2 Meeting #97, S2-131972, SA WG2 Temporary Document, Busan, South Korea, May 27-31, 2013 (May 21, 2013), pp. 1-3.

* cited by examiner

FIG. 7
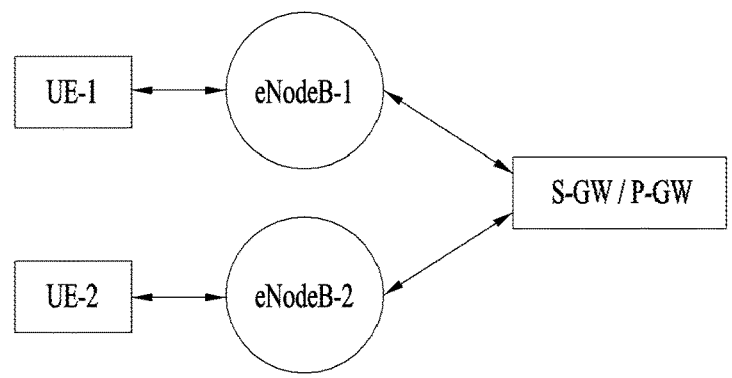
FIG. 8
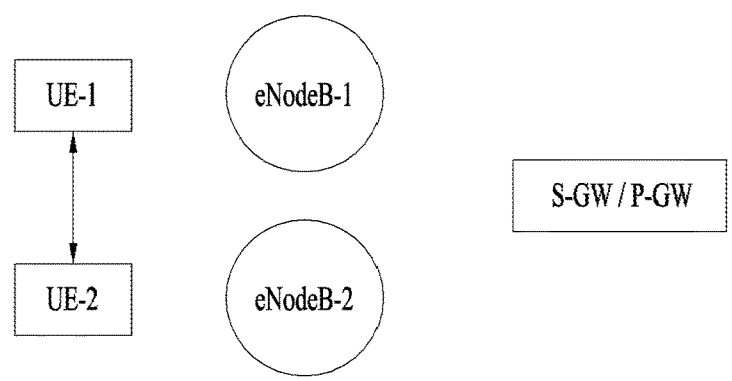
(a) UE-1 and UE-2 camp on different eNodeBs
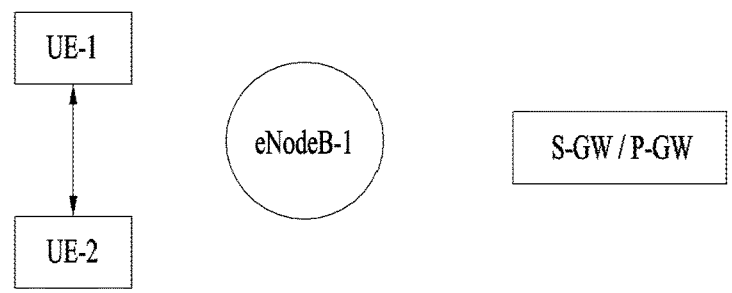
(b) UE-1 and UE-2 camp on same eNodeB (a)    (b)

METHOD AND DEVICE FOR SELECTING RELAY IN WIRELESS COMMUNICATION SYSTEM

CROSS REFERENCE TO RELATED APPLICATIONS

This application is the National Phase of PCT/KR2015/008346 filed on Aug. 10, 2015, which claims priority under 35 U.S.C. § 119(e) to U.S. Provisional Application Nos. 62/035,478 filed on Aug. 10, 2014 and 62/035,479 filed on Aug. 10, 2014, all of which are hereby expressly incorporated by reference into the present application.

TECHNICAL FIELD

The following description relates to a wireless communication system, and more particularly, to a method and device for selecting a UE-to-UE relay and a UE-to-Network Relay in ProSe communication.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide selection of a UE-to-UE relay and a UE-to-Network Relay in ProSe communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method of selecting, by a first UE for a proximity service (ProSe), a relay in a wireless communication system comprises the steps of transmitting a UE-to-Network Relay discovery message; selecting a second UE as a UE-to-Network Relay; establishing a connection for direct communication with the second UE; and transmitting a registration request message to a group communication service application server (GCS AS) through the second UE, wherein when the UE-to-Network Relay discovery message includes UE-to-UE Relay related request information, the UE-to-UE Relay related information is received from the second UE and the second UE is selected as the UE-to-UE Relay based on the UE-to-UE relay related information.

In another embodiment of the present invention, a ProSe UE for selecting a relay in a wireless communication system comprises a transceiver; and a processor, wherein the processor transmits a UE-to-Network Relay discovery message, selects a second UE as a UE-to-Network Relay, establishes a connection for direct communication with the second UE, and transmits a registration request message to a group communication service application server (GCS AS) through the second UE, and wherein when the UE-to-Network Relay discovery message includes UE-to-UE Relay related request information, the UE-to-UE Relay related information is received from the second UE and the second UE is selected as the UE-to-UE Relay based on the UE-to-UE relay related information.

If the registration request message includes UE-to-UE Relay related request information, the UE-to-UE Relay related information may be received from the GCS AS, and the second UE may be selected as the UE-to-UE Relay on the basis of the UE-to-UE Relay related information.

The first UE may be located outside coverage.

The UE-to-UE Relay related information may include one or more of information indicating that the UE-to-UE Relay shall be selected, information indicating that communication will be performed through the UE-to-UE Relay, information indicating information required to select/determine the UE-to-UE Relay is requested, information on a UE which becomes a target for communication through the UE-to-UE Relay, and information on a group which becomes a target for communication through the UE-to-UE Relay.

The UE-to-UE Relay related information received from the second UE may include one or more of information on a UE to which the second UE currently provides a UE-to-Network Relay, information on a UE having a proximity relation with the second UE, information on a group to which the second UE may provide a UE-to-UE Relay function, and information indicating that the second UE may be selected as the UE-to-UE Relay.

The UE-to-UE Relay related information received from the GCS AS may include one or more of information on a UE that receives EPC connectivity through the same UE-to-Network Relay as the UE, information on a UE which camps on the same cell as that of the UE-to-Network Relay which serves the UE, information on a UE which camps on a neighboring cell of the cell camped on by the UE-to-Network Relay which serves the UE, and information on a UE having a proximity relation with the second UE.

If the UE-to-Network Relay discovery message includes UE-to-UE Relay related request information, the UE-to-UE Relay related information may be included in a UE-to-Network Relay discovery response.

If the registration request message includes UE-to-UE Relay related request information, the UE-to-UE Relay related information may be included in a registration response message.

The method may further comprise the steps of receiving a registration response message in response to a response to the registration request message; and establishing the connection with the UE determined based on the UE-to-UE Relay related information.

The UE-to-Network Relay discovery message may be one of an announcement message or a solicitation message.

The UE-to-Network Relay discovery message may be a PC5-D message.

Advantageous Effects

According to the present invention, unnecessary procedures may be avoided to efficiently select a UE-to-UE relay and a UE-to-Network Relay.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates a default data path through which two UEs perform communication with each other in an EPS;

FIG. 8 illustrates a direct mode data path between two UEs based on ProSe;

BEST MODE FOR CARRYING OUT THE INVENTION

Figure 1:
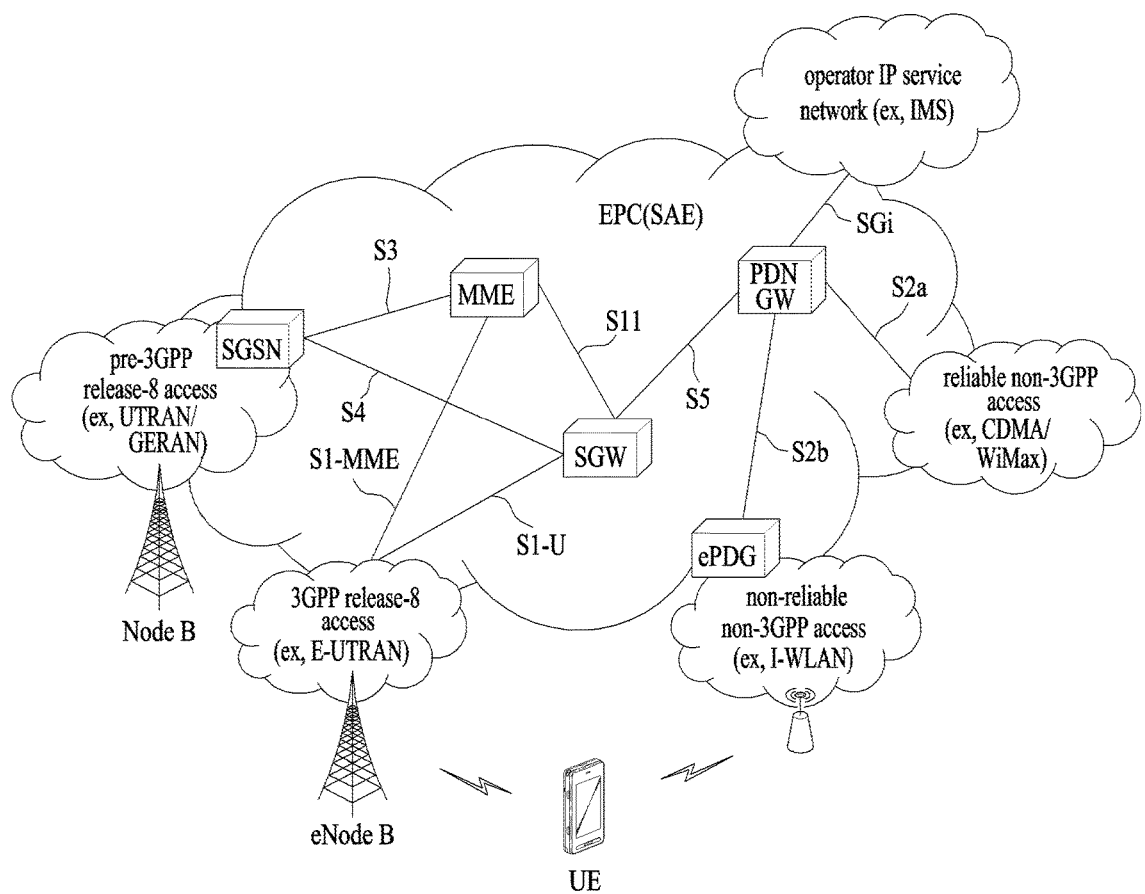
FIG. 1 is a diagram illustrating a brief structure of an EPS (evolved packet system) that includes an EPC (evolved packet core)

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MIMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/ communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/ GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
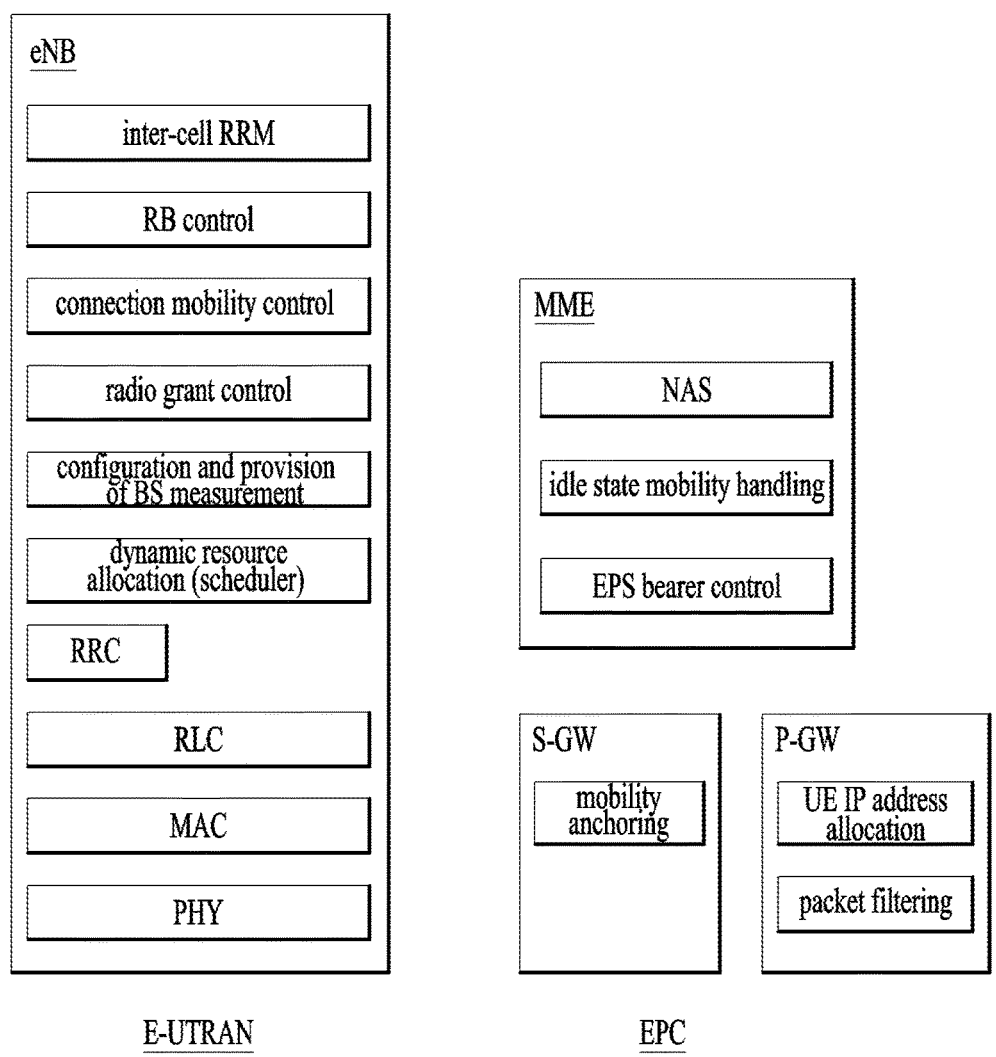
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE IDLE state management, ciphering of the user plane, SAE bearer control, and ciphering and integrity protection of NAS signaling.

Figure 3:
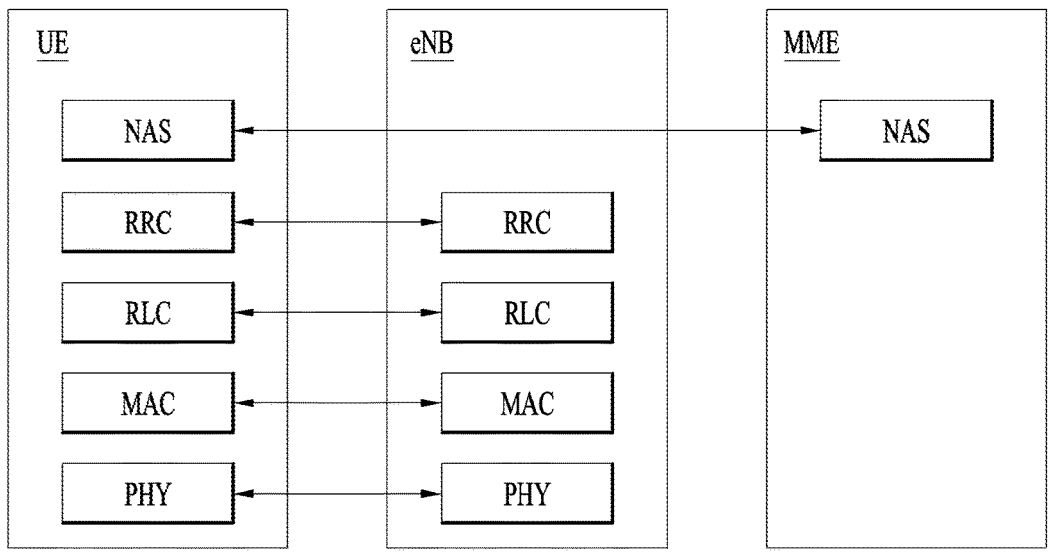
FIG. 3 is an exemplary diagram illustrating a structure of a radio interface protocol on a control plane.
Figure 4:
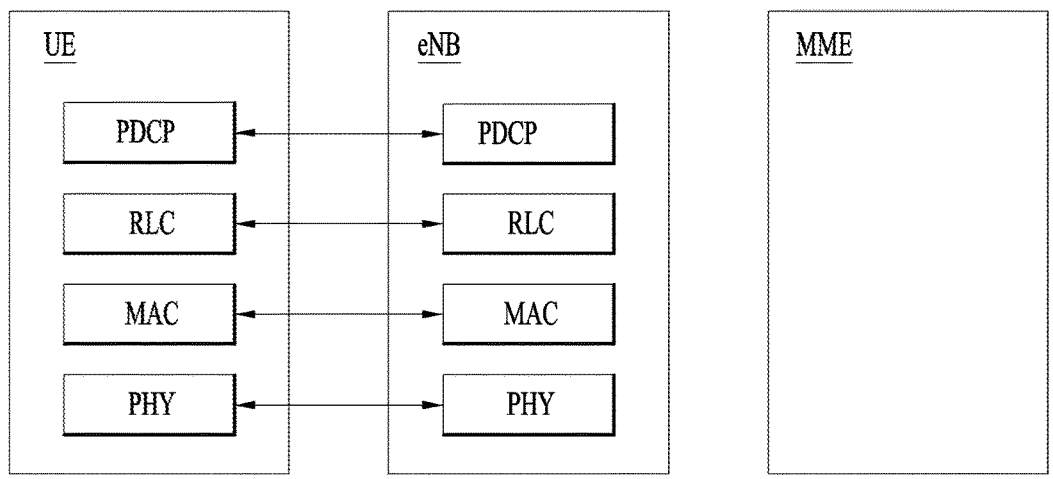
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
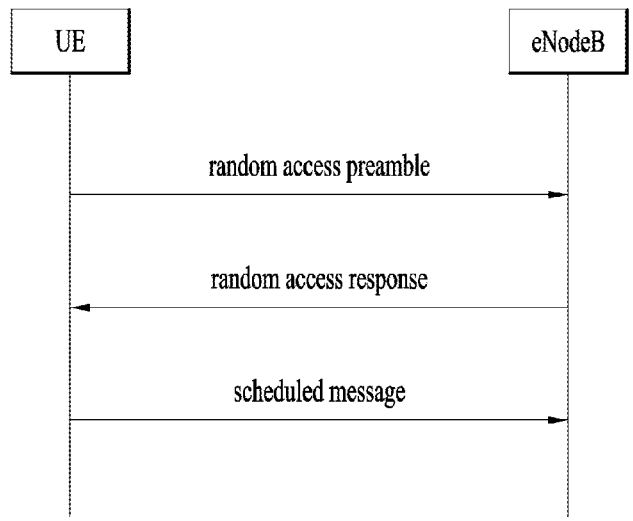
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
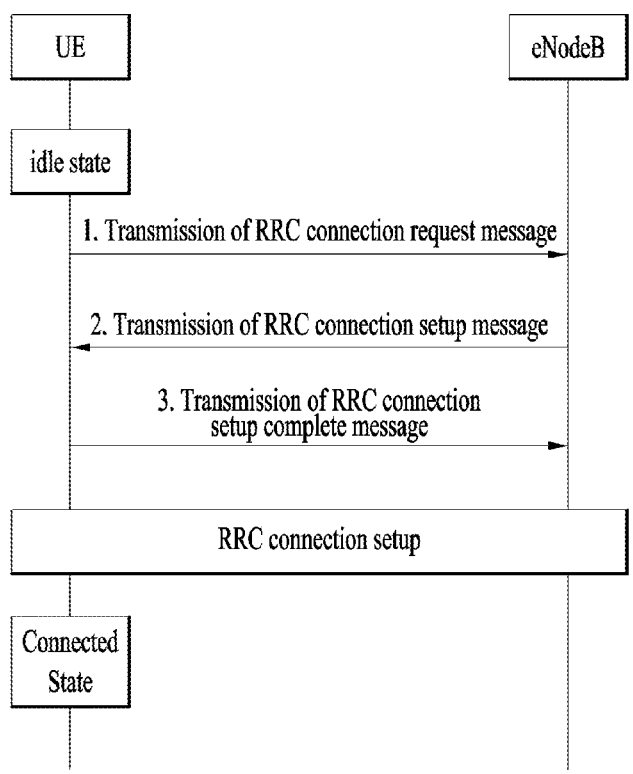
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

ProSe (Proximity Service)

Prose service means a service that enables discovery between physically proximate devices and mutual direct communication, communication through a base station or communication through a third device.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

FIG. 8 illustrates a direct mode data path between two UEs based on ProSe. This direct mode communication path does not pass through the eNodeB and the core network (i.e., EPC), which are managed by an operator. FIG. 8(*a*) illustrates a case that UE-1 and UE-2 are camping on different eNodeBs and exchange data through a direct mode communication path. FIG. 8(*b*) illustrates a case that two UEs are camping on the same eNodeB and exchange data through a direct mode communication path.

Figure 9:
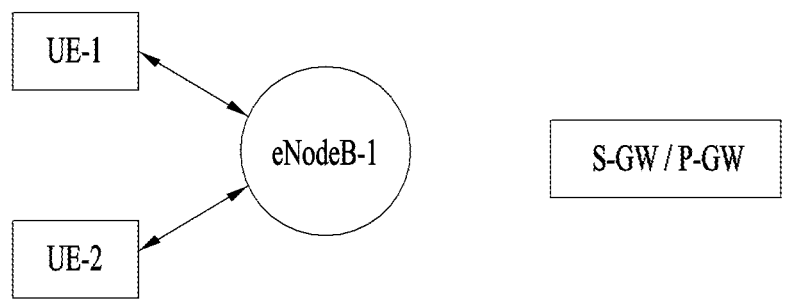
FIG. 9 illustrates a locally routed data path through eNodeB between two UEs based on ProSe.

FIG. 9 illustrates a locally routed data path through eNodeB between two UEs based on ProSe. This communication path through eNodeB does not pass through a core network (i.e., EPC) managed by an operator.

Figure 10:
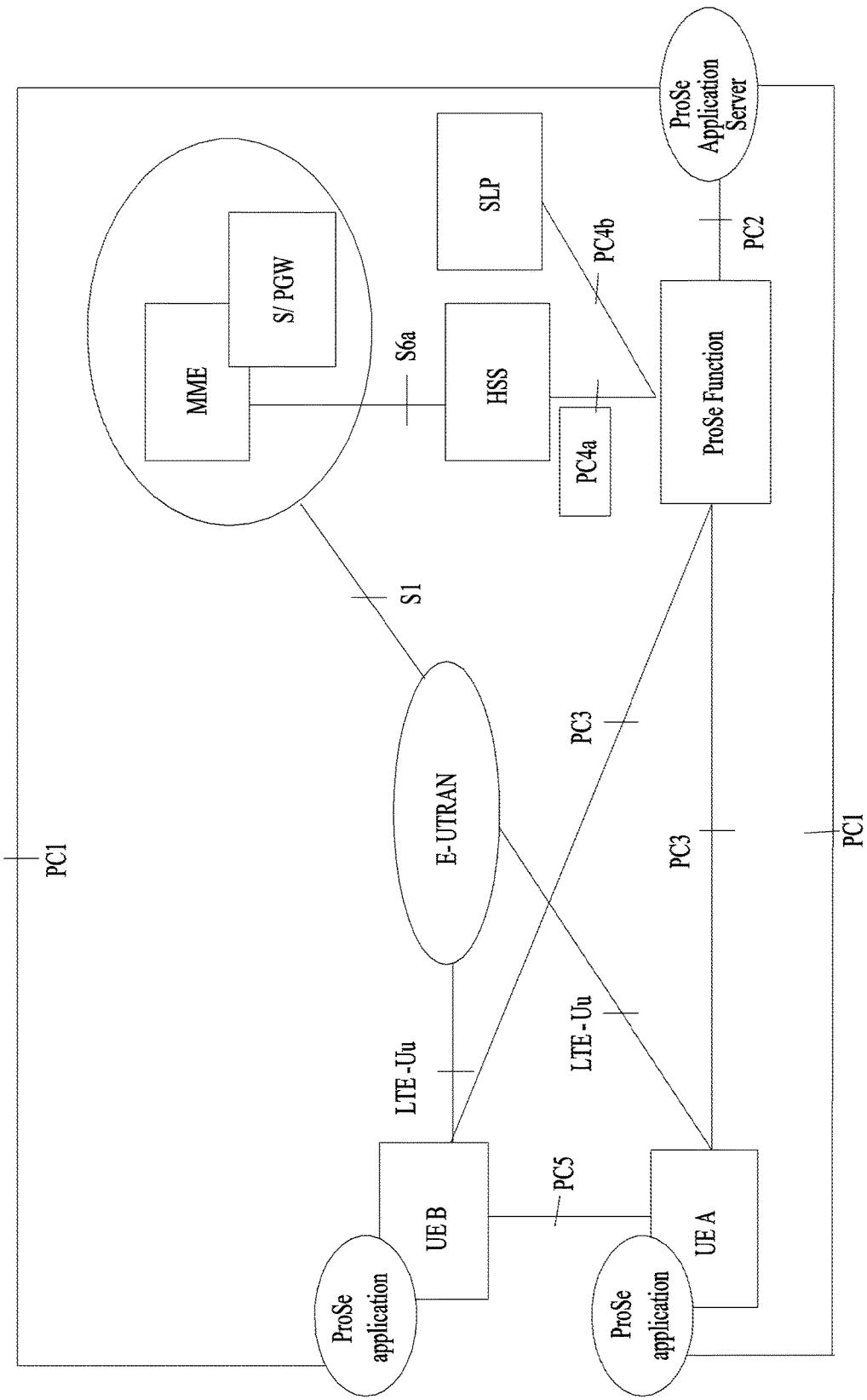
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
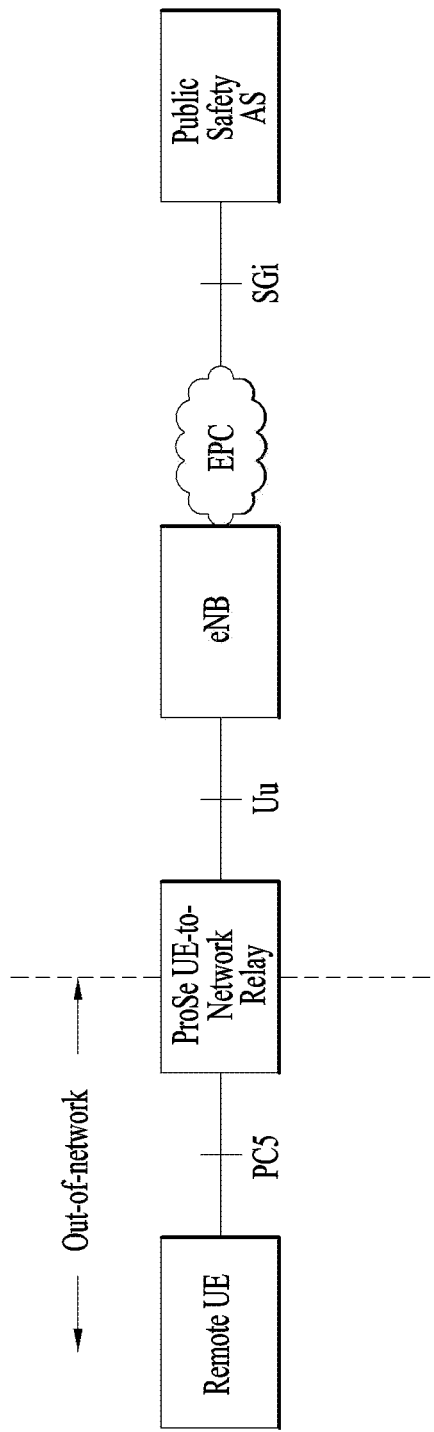
FIG. 11 is a diagram illustrating communication through a Prose UE-to-Network Relay.
Figure 12:
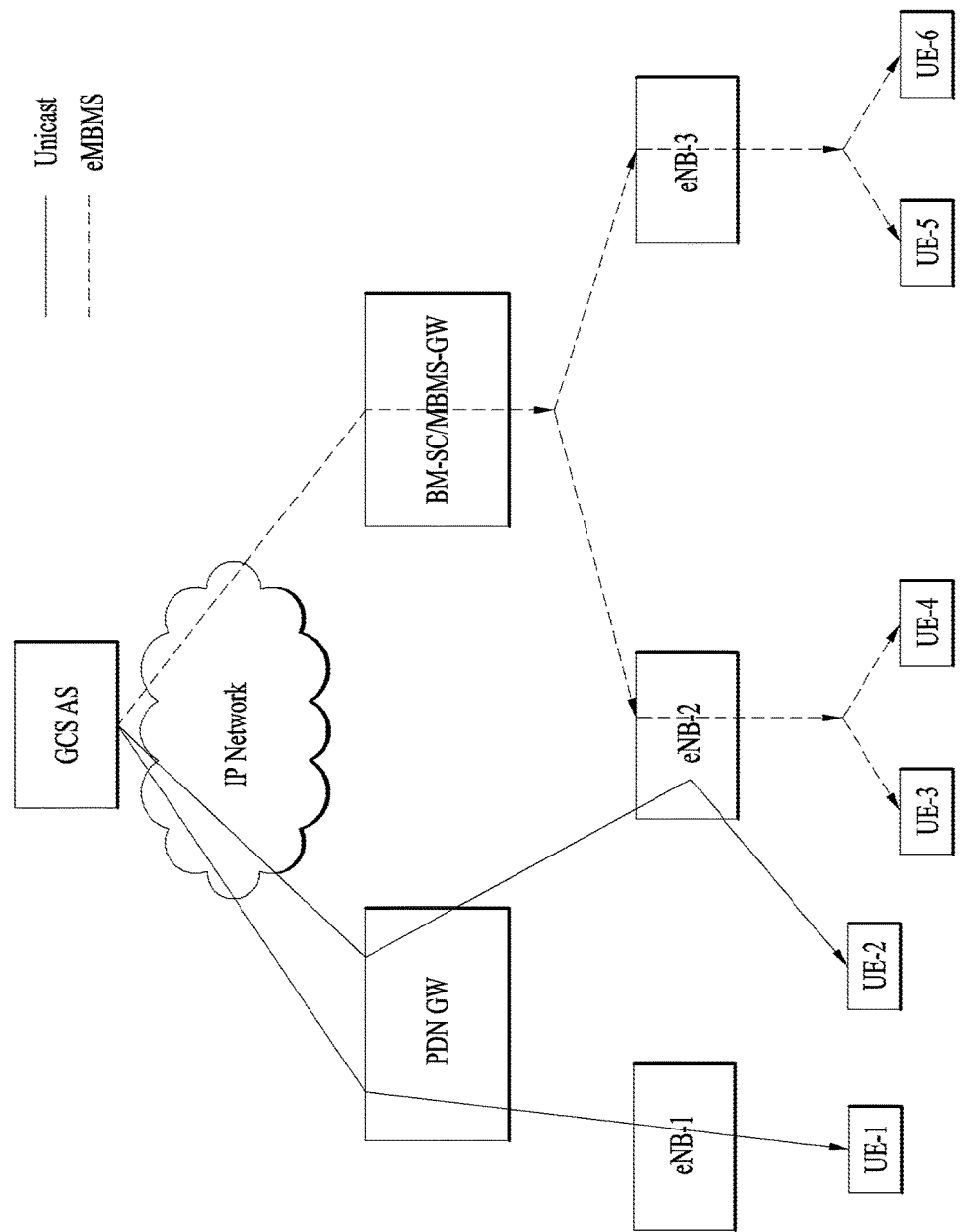
FIG. 12 is a diagram illustrating media traffic of group communication.

FIG. 11 illustrates communication through a ProSe UE-to-Network Relay. The most important object of connectivity provided from a remote UE to the EPC through the UE-to-Network Relay is to join group communication as illustrated in FIG. 12. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
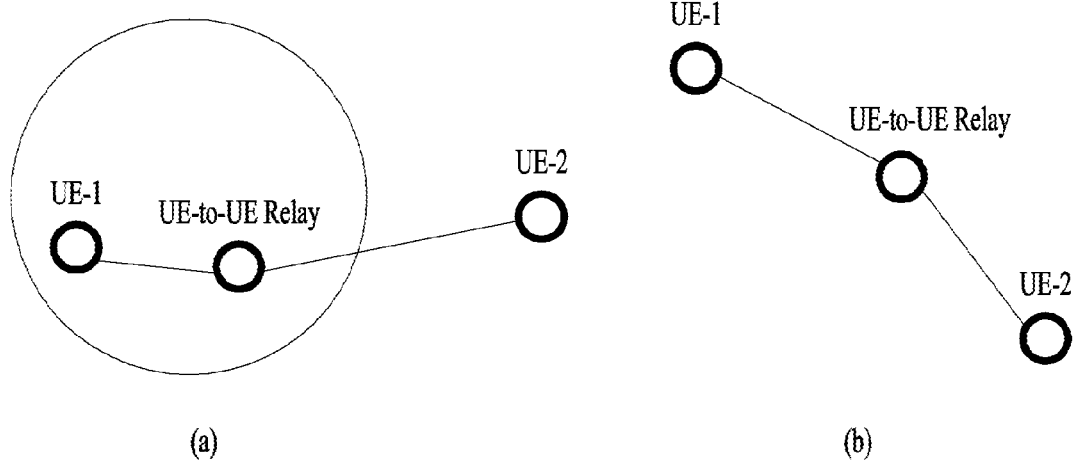
FIG. 13 is a diagram illustrating communication through a UE-to-UE Relay.

Subsequently, an example of UE-to-UE Relay communication is shown in FIG. 13. In more detail, FIG. 13(*a*) illustrates that UE, that is, UE-1, which is served by E-UTRAN (or UE within E-UTRAN coverage) and UE, that is, UE-2, which is not served by E-UTRAN perform communication through a UE-to-UE Relay, and FIG. 13(*b*) illustrates that UE-1 and UE-2 which are not served by E-UTRAN perform communication through the UE-to-UE Relay. In FIGS. 13(*a*) and 13(*b*), the UE-to-UE Relay may be served or not by the E-UTRAN. Communication may be one-to-one communication between two UEs (that is, UE-1 and UE-2), or may be one-to-many communication. In the following description, one-to-many communication is used as the same or similar meaning as or to group communication.

Figure 14:
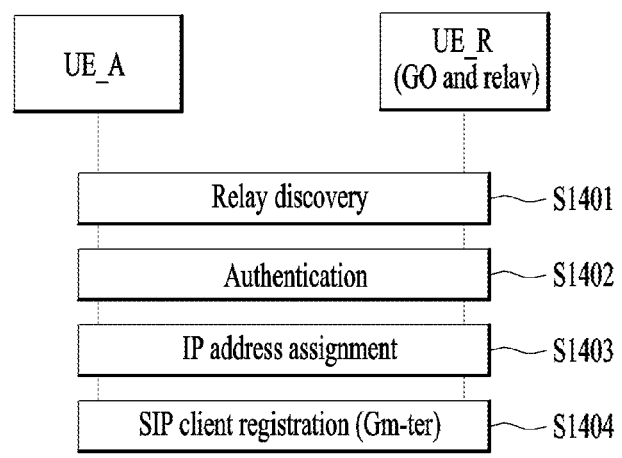
FIG. 14 is a diagram illustrating a method for monitoring a UE-to-UE Relay to perform one-to-many communication with other UEs which belong to a group.

In FIG. 14, a method for monitoring a UE-to-UE Relay, that is, UE_R to perform one-to-many communication with other UEs belonging to a group. Referring to FIG. 14, a UE_A is outside network coverage, and needs to discover the UE-to-UE Relay to increase a communication range. The UE_R has a UE-to-UE Relay capability.

Step S1401 is a relay discovery procedure. In this case, the UE_R may automatically start a ProSe group, and may transmit a beacon message that advertises a UE-to-UE Relay capability. The UE_A may periodically transmit a probe message (e.g., target ProSe discovery) indicating that a specific GCSE group and/or relay service is discovered. The UE_R starts a ProSe group until the probe message is received, and may respond to the UE_A that the UE_R may be operated as a relay. A user of the UE_R may identify that the UE_R belongs to a transmission range of the UE_A and the UE_B, by using a human channel. The user of the UE_R may identify that the UE_A and the UE_B are not within a mutual communication range by talking to both the UE_A and the UE_B. The user of the UE_R may provide that the UE_R performs the role of UE-to-UE Relay, or may join GCSE group communication.

In an authentication procedure of step S1402, the UE_A may perform mutual authentication with a GO (Group Owner) (based on certificates or a common pre-shared secret). A PMK (Pairwise Master Key) may be generated as a part of the authentication procedure, and may be used to protect unicast traffic between the UE_A and the GO. At step S1403, the GO may allocate an IP address for use in a local ProSe IP subnet to the UE_A. In this case, the UEs know respective layer-2 IDs. At step S1404, SIP client within the UE-A may be registered with an SIP server within a relay through Gm-ter.

Figure 15:
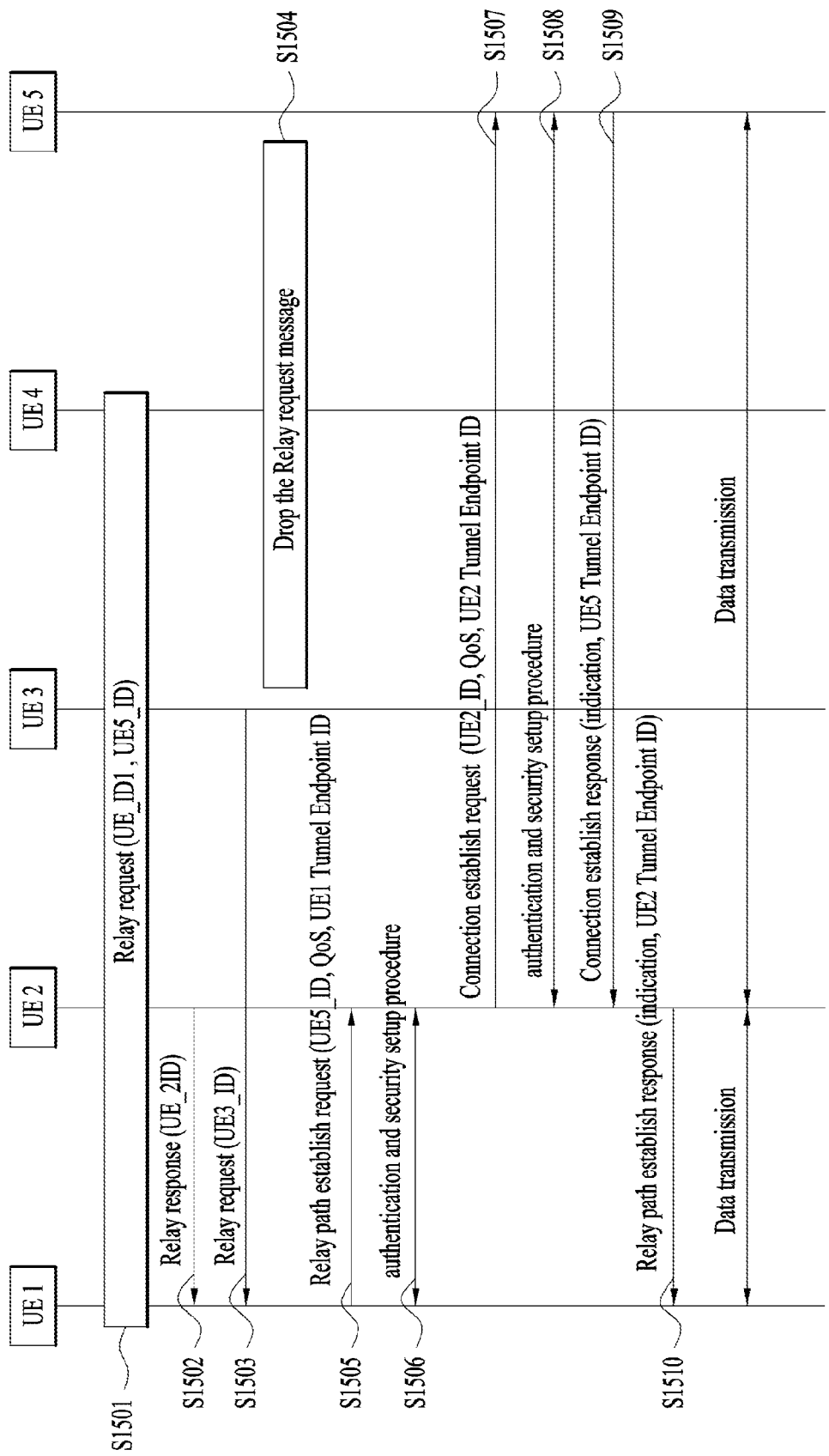
FIG. 15 is a diagram illustrating a method for monitoring a UE-to-UE Relay to perform one-to-one communication.

FIG. 15 illustrates a method for monitoring a UE-to-UE Relay, that is, UE2 to allow a random UE, that is, UE1 to perform one-to-one communication with a specific UE, that is, UE5. At step S1501, the UE1 which desires perform communication with the UE5 may discover that the UE5 is not proximate thereto. To discover the UE-to-UE Relay for communication, the UE1 may broadcast a relay request message that includes identifiers of the UE 1 and the UE 5. At steps S1502 to S1504, operations of the UEs that have received the relay request message will be described. If the UEs proximate to the UE1 receive the relay request message, the UE may determine whether the UE may be operated as a relay for the UE1 and the UE5, on the basis of relay capability, proximity relationship, current process load, signal strength received from a target UE, and user preference. If the UE may be operated as a relay, the UE may transmit a relay response message, which includes identifier of the UE, to the UE1. If not so, the UE may drop the relay request message. At step S1505, the UE1 may acquire UEs (UE2 and UE3), which may be operated as relays, and may select one of the acquired UEs on the basis of signal strength, etc. In FIG. 15, the UE2 is selected as a relay as an example. The UE1 may transmit a relay path establishment request message to the UE2, wherein the relay path establishment request message may include identifier of the UE5, QoS of the path, and UE1 Tunnel Endpoint ID. The UE1 Tunnel Endpoint ID is allocated by the UE1 to uniquely identify a tunnel endpoint of a tunnel between the UE1 and the UE2. At step S1506, authentication and security between the UE1 and the UE2 are set up. At step S1507, the UE2 may transmit a connection establishment request message, which includes identifier of the UE2, QoS of the path, and UE2 Tunnel Endpoint ID, to the UE5. The UE2 Tunnel Endpoint ID is allocated by the UE2 to uniquely identify a tunnel endpoint of a tunnel between the UE2 and the UE5. At step S1508, authentication and security between the UE2 and the UE5 are set up. At step S1509, the UE5 may transmit a connection establishment response message, which indicates whether the UE5 accepts relay path establishment through the UE2, to the UE2. If the UE5 accepts the request, UE5 Tunnel Endpoint ID is included in the connection establishment response message. The UE5 Tunnel Endpoint ID is allocated by the UE5 to uniquely identify a tunnel endpoint of a tunnel between the UE2 and the UE5. At step S1510, the UE2 may receive a response message from the UE5. If the message indicates that the path between the UE2 and the UE5 has been established successfully, the UE2 may transmit a relay path establishment response message, which indicates that the communication path has been established successfully and includes UE2 Tunnel Endpoint ID, to the UE1. The UE2 Tunnel Endpoint ID is allocated by the UE2 to uniquely identify a tunnel endpoint of a tunnel between the UE1 and the UE2.

Figure 16:
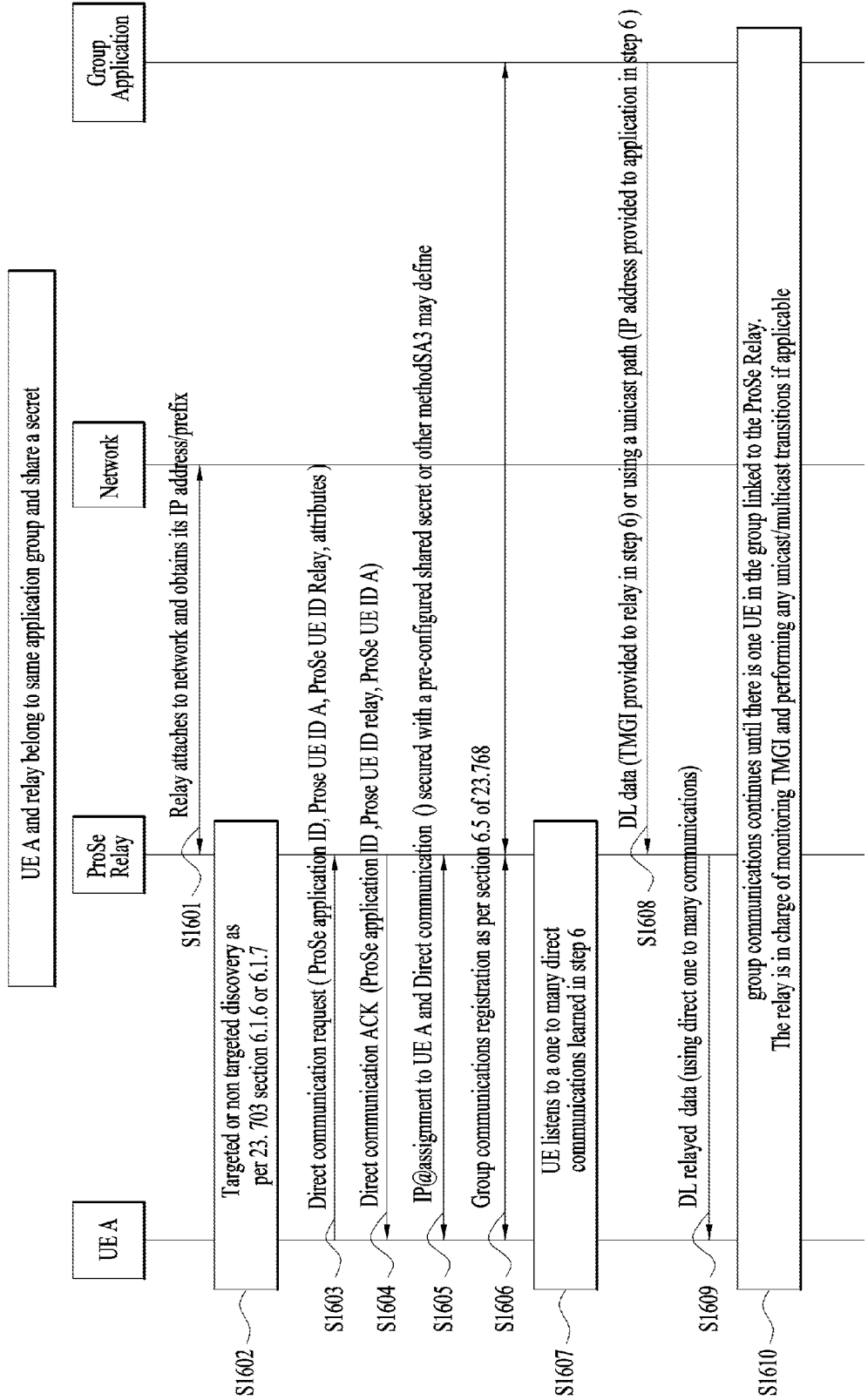
FIG. 16 is a diagram illustrating a procedure of monitoring a UE-to-Network Relay for supporting group communication.

FIG. 16 illustrates a procedure of monitoring a UE-to-Network Relay for supporting group communication to allow a random UE which is not served by E-UTRAN to perform group communication.

At step S1601, a ProSe UE-to-Network Relay may be attached to a network to obtain prefix for a PDN supported for a group and IP address. At step S1602, the UE may perform discovery procedure for a ProSe relay. At steps S1603 to S1605, ProSe communication link between UE and relay may be established. If IPv6 is used by the relay, the relay may use prefix delegation from a PGW. At step S1606, the UE may initiate an application and registration procedure. Details of this procedure will be understood with reference to TR 23.768. At step S1607, the UE may perform indications learned from the ProSe relay at the step S1606. At step S1608, DL data may reach the ProSe relay through multicast or unicast. At step S1609, the UE may continue to perform group communication at step S1610 after receiving DL data at the step S1606.

UE-to-Network Relay discovery and UE-to-UE Relay discovery may be used by discovery types of Model A type and Model B type. (see 6.1 of TR 23.713v1.4.0 (Solution for Direct Discovery (public safety use)) and 5.3.1.2 of TS 23.303 (ProSe Direct Discovery Models))

Model A ("I am here") discovery defines ProSe-enabled UEs as Announcing UE and Monitoring UE. The Announcing UE is a UE that announces information, which may be used by UEs within a proximate distance for allowing discovery, and the Monitoring UE is a UE that receives information from the Announcing UE. The Announcing UE broadcasts a discovery message at a predetermined discovery interval, and the Monitoring UE reads and processes the discovery message.

Model B ("who is there?"/"are you there?") discovery defines a discoverer UE and a discoveree UE as the role of UEs. The discoverer UE requests information interested in discovering, and the discoveree UE is a UE that receives a discover request and responds to information related to the discover request. During the UE-to-Network Relay Discovery operation and the UE-to-UE Relay Discovery operation, parameters/information included in a Direct Discovery message (i.e., PC5-D message) are as follows.

In the Model A discovery, parameters included in the UE-to-Network Relay Discovery Announcement message are as illustrated in Table 2.

TABLE 2

ProSe Relay UE ID: link layer identifier that is used for direct communication and is associated with a PDN connection the ProSe UE-to-Network Relay has established.
Announcer info: provides information about the announcing user.
Relay Service Code: parameter identifying a connectivity service the ProSe
UE-to-Network Relay provides to Public Safety applications. The Relay Service Codes are configured in a ProSe UE-to-Network relay for advertisement and map in the ProSe UE-to-Network relay to specific APNs
they offer connectivity to. Additionally, the Relay Service Code also identifies authorized users the ProSe UE-to-Network relay would offer service to, and may select the related security policies or information e.g. necessary for authentication and authorization between the Remote UE and
the ProSe UE-to-Network Relay (e.g. a Relay Service Code for relays for police members only would be different than a Relay Service code for relays for Fire Fighters only, even though potentially they provided connectivity to same APN e.g. to support Internet Access).
Radio Layer Information: contains information about the radio layer information, e.g. radio conditions between the eNB and the UE-to-Network
Relay, to assist the Remote UE selecting the proper UE-to-Network Relay.

In Model B discovery, parameters included in a UE-to-Network Relay Discovery Solicitation message are as illustrated in Table 3.

TABLE 3

Discoverer info: provides information about the discoverer user.
Relay Service Code: information about connectivity that the discoverer UE is interested in. The Relay Service Codes are configured in the Prose Remote UEs interested in related connectivity services.
ProSe UE ID: link layer identifier of the discoverer that is used for direct communication (Model B).

In Model B discovery, parameters included in a UE-to-Network Relay Discovery Response message are as illustrated in Table 4.

TABLE 4

ProSe Relay UE ID: link layer identifier that is used for direct communication and is associated with a PDN connection the ProSe UE-to-Network Relay has established.
Discoveree info: provides information about the discoveree.
Radio Layer Information: contains information about the radio layer information, e.g. radio conditions between the eNB and the UE-to-Network Relay, to assist the Remote UE selecting the proper UE-to-Network Relay.

In Model A discovery, parameters included in a UE-to-UE Relay Discovery Announcement message are as illustrated in Table 5.

TABLE 5

ProSe UE ID: link layer identifier that is used for direct communication.
Announcer info: provides information about the announcing user.
Remote User Info: provides information about the user of a Remote UE. That is, UE-to-UE Relay includes information on User/UE(s) within its proximity in this information.

In Model B discovery, parameters included in a UE-to-UE Relay Discovery Solicitation message are as illustrated in Table 6.

TABLE 6

ProSe UE ID: link layer identifier that is used for direct communication.
Discoverer info: provides information about the discoverer user.
Remote User Info: provides information about the user of a Remote UE. That is, information on User/UE(s), which is desired to perform communication through UE-to-UE Relay is included in this information.

In Model B discovery, parameters included in a UE-to-UE Relay Discovery Response message are as illustrated in Table 7.

TABLE 7

ProSe UE ID: link layer identifier that is used for direct communication.
Discoveree info (Model B): provides information about the discoveree.
Remote User Info: provides information about the user of a Remote UE. As response information to Remote User Info included in the UE-to-UE Relay Discovery Solicitation message, the UE-to-UE Relay includes information on User/UE(s) within its proximity in this information.

Figure 17:
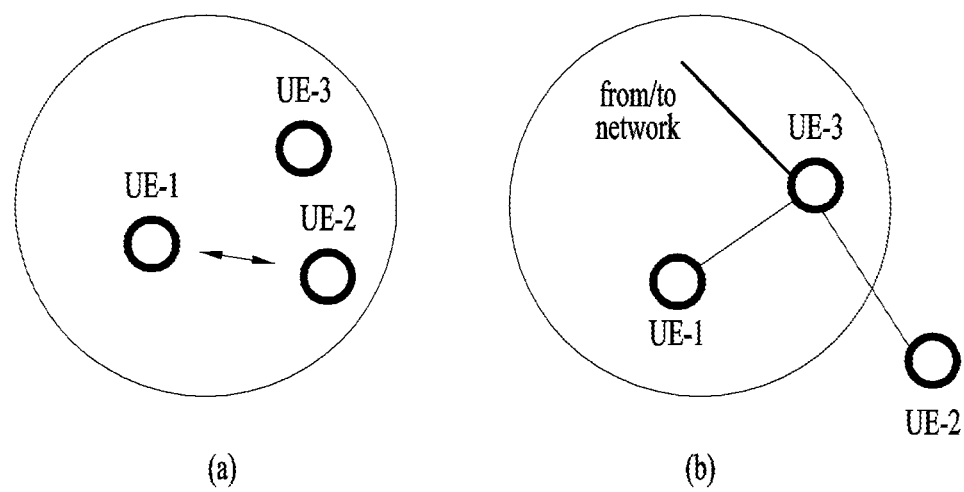
FIG. 17 is a diagram illustrating a problem that may occur in a procedure of selecting a relay.

Meanwhile, if UE outside coverage joins group communication through the EPC and at the same time desires to perform one-to-one communication with another neighboring UE which is not directly proximate thereto, and/or perform one-to-many communication including other neighboring UEs, which are not directly proximate thereto, the UE-to-UE Relay as well as the UE-to-Network Relay should be monitored. This relay monitoring procedure requires a related message exchange procedure and time. Particularly, if a random UE monitors the UE-to-UE Relay to perform one-to-one communication with a specific another UE, the UE needs a procedure of verifying whether a target UE is proximate thereto to determine whether a UE, which has received the UE-to-UE Relay request message as described in steps 2 to 4 of 6.3.5.2 of TR 23.703 v12.0.0, may perform the role of the UE-to-UE relay. Therefore, additional procedure and time may be required. A detailed case that this problem may occur is illustrated in FIG. 17. In FIG. 17, UE-1, UE-2 and UE-3 are all served by the E-UTAN, and the UE-1 and the UE-2 perform direct communication. As the UE-2 moves, the UE-2 is outside network coverage, whereby the UE-2 should discover a UE-to-Network Relay to receive a connection service to the network. Since the UE-2 is not proximate to the UE-1 any more due to movement, the UE-2 which cannot perform direct communication with the UE-1 desires to discover the UE-to-UE Relay to continue to perform communication with the UE-1. As shown in FIG. 17(b), it is assumed that the same UE, that is, UE-3 may provide UE-to-Network Relay service and UE-to-UE Relay service with the UE-1 to the UE2. According to the related art procedure, after selecting the UE-to-Network relay through the operation for monitoring the UE-to-Network Relay, the UE-2 may select the UE-to-UE Relay through the operation for monitoring the UE-to-UE relay. Alternatively, on the contrary, after selecting the UE-to-UE Relay through the operation for monitoring the UE-to-UE relay, the UE2 may select the UE-to-Network Relay through the operation for monitoring the UE-to-Network Relay.

Also, when the UE-to-Network Relay performs Model A type discovery indicating its presence in respect of the UE-to-Network relay monitoring operation, various parameters/information are included in the UE-to-Network Relay discovery announcement message. Also, when the UE-to-UE Relay performs Model A type discovery indicating its presence in respect of the UE-to-UE relay monitoring operation, various parameters/information are included in the UE-to-UE Relay discovery announcement message. The discovery messages used for the operation for monitoring the UE-to-Network Relay and the operation for monitoring the UE-to-UE Relay are all PC5S-D (PC5 "discovery Plane" stack) messages, and may have restriction in their sizes. That is, for direct discovery operation, it is more efficient that one message is transmitted wirelessly than that one message is transmitted wirelessly by being divided several times. Therefore, in Rel-12, one size of the PC5-D message is restricted to 232 bits. Therefore, even though the UE that enables UE-to-Network Relay service enables the UE-to-UE relay service simultaneously with the UE-to-Network Relay service, it is practically impossible that one PC5-D message includes both UE-to-Network Relay discovery announcement related parameter/information and UE-to-UE relay discovery announcement related parameter/information.

Hereinafter, in the embodiment of the present invention, to solve the aforementioned problem, when a UE which needs communication through the UE-to-Network Relay and the UE-to-UE Relay monitors the Relay, a relay selection method that may save the procedure and time will be described.

In the following description, a UE outside coverage may mean a UE which is not served by E-UTRAN, a UE which is outside E-UTRAN coverage, or a UE which is outside network coverage.

Embodiment 1

Figure 18:
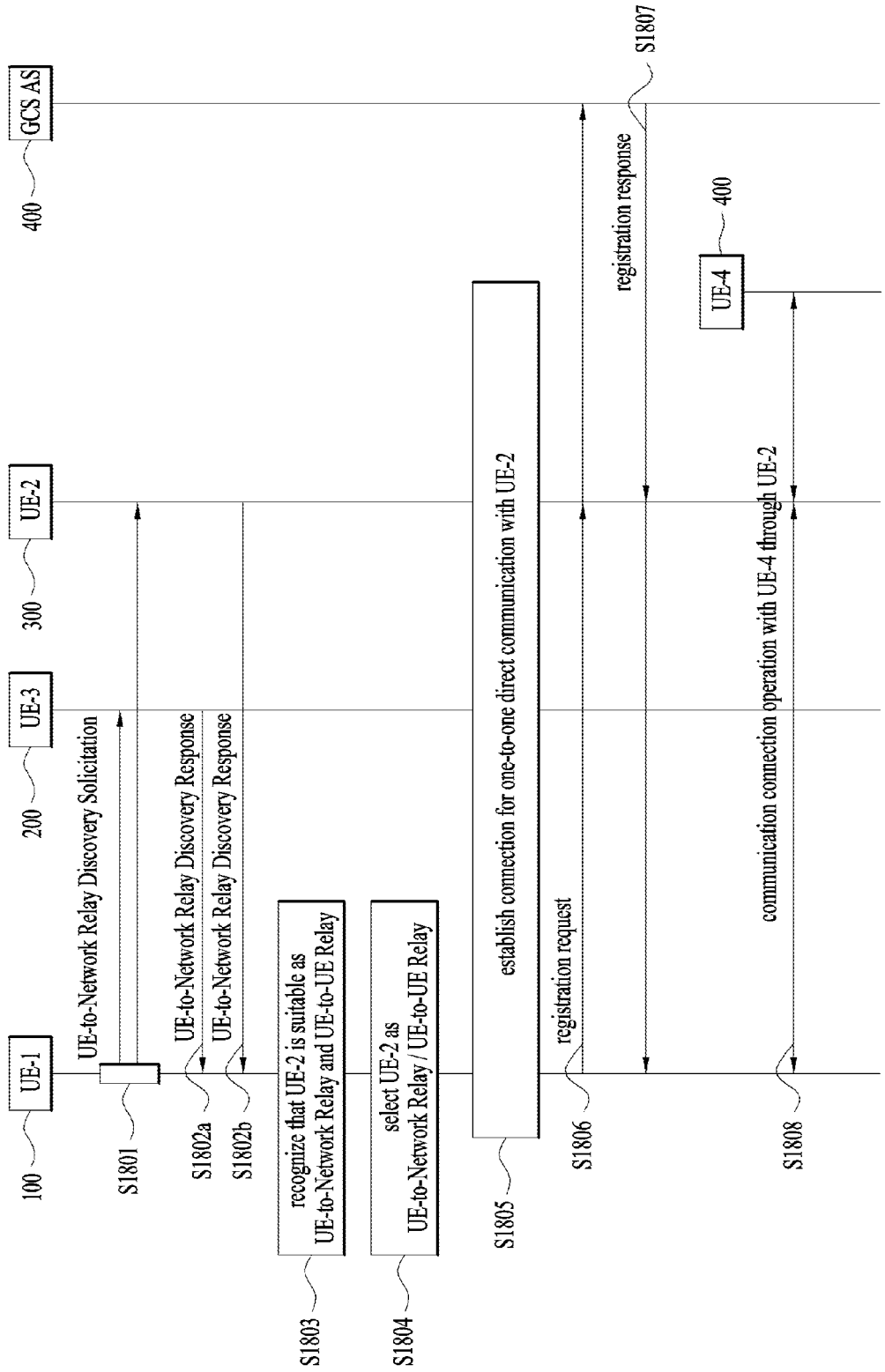
FIGS. 18 and 19 are diagrams illustrating a procedure of relay selection according to the embodiment of the present invention.

FIG. 18 illustrates a procedure of relay selection according to the first embodiment of the present invention.

Referring to FIG. 18, at step S1801, a first UE (UE-1) may transmit a UE-to-Network Relay discovery message to a second UE (UE-2). In this case, the first UE is a UE that performs a UE-to-Network Relay discovery to receive connection service to a network as the UE gets out of E-UTRAN or desires to get out of E-UTRAN. Also, in this case, discovery may be Model B type UE-to-Network Relay discovery. Also, the UE-to-Network Relay discovery message may include UE-to-UE Relay related request information. In this case, the UE-to-UE Relay related request information may mean one or more of information included in the following Table 8. This information may be provided explicitly or implicitly. Also, this information may be provided in a combination type. Also, this information may be provided in a combination type with information for requesting the UE-to-Network Relay.

TABLE 8

Information indicating that UE should select/determine a UE-to-UE Relay
Information indicating that UE desires to perform communication through a UE-to-UE Relay: this may be represented by identifying one-to-one communication or one-to-many communication or both one-to-one communication and one-to-many communication.
Information indicating that UE requests information required to select/determine a UE-to-UE Relay
Information on UE(s) which become(s) target(s) for communication through a UE-to-UE Relay: this may be identifier information of target UE(s).
Information on group(s) which become(s) targets desired by a UE for communication through a UE-to-UE Relay: this may be identifier information of group(s) of target group(s).

At step S1802a, b, the second UE and the third UE that have received the UE-to-Network Relay discovery Solicitation message transmitted from the first UE may transmit a UE-to-Network Relay discovery response message. The second UE includes UE-to-UE Relay related information in the UE-to-Network Relay discovery response message. Selectively, since the third UE cannot provide UE-to-UE Relay service to the fourth UE, the third UE may not transmit the UE-to-Network Relay discovery response message. In this case, the UE-to-UE Relay related information may mean that the UE-to-UE Relay service with the fourth UE (UE-4) can be provided. In more detail, the UE-to-UE Relay related information may be one or more of information included in the following Table 9. Also, the UE-to-UE Relay related information may include information as to whether the information shall be selected, information as to whether the information should be selected (selection is recommended), and information as to whether the information may be selected (determined by the UE). The UE that may provide a UE-to-Network Relay function may transmit the UE-to-UE Relay related information, which may provide the UE-to-Network Relay function, by including the UE-to-UE Relay related information in a procedure of announcing its relay function.

TABLE 9

Information as to that UE(s), which can provide a UE-to-Network Relay function, currently provides UE-to-Network Relay: information on UE(s), which currently provides a UE-to-Network Relay, may be identifier information (Application User ID information and/or identifier information of group to which UE belongs and/or Layer-2 ID information of UE and/or IP address information of UE) on UE. This may equally be applied to information on UE(s) provided by the following ii).
Information on UE(s) having a proximity relation with UE that may provide UE-to-Network Relay function: this information may be information acquired by UE, which can provide a UE-to-Network Relay function, by performing direct discovery, may be information provided from GCS AS, or may be information acquired through EPC-level ProSe discovery. The information on UE(s) having the proximity relation may be added to information on each UE or replaced with information on each UE to provide information on group to which the UE belongs.
Information on group(s) in which UE, which can provide UE-to-Network Relay function, can provide UE-to-UE Relay function: this information may mean only information on group(s) that currently provides UE-to-UE Relay function, or may mean information on all group(s) that can provide UE-to-UE Relay function by including the information on groups.
Information indicating that UE, which can provide UE-to-Network Relay function, can select itself as UE-to-UE Relay:

The information illustrated in Table 9 may be provided explicitly or implicitly. Also, this information may be provided in a combination type. The aforementioned information may include only information on UE(s) belonging to the same group as that of the UE (that is, UE which receives information) or not. Particularly, if a UE, that is, the first UE transmits information on group(s) which become(s) target(s) for communication through the UE-to-UE Relay, UEs, which may provide a UE-to-Network Relay function, that is, the second UE and the third UE may include only information on UE(s) belonging to the group(s). Also, this may include only information on UE(s) accepted or authorized to perform communication with the UE (that is, UE which receives information), or not.

Also, the UE which has received UE-to-Network Relay discovery may transmit UE-to-UE Relay related information to a specific UE only or all UEs. However, even though UE-to-UE Relay related information is transmitted to all UEs, a set of UEs, which can actually understand this information, may be defined previously (for example, UEs which belong to a specific group). The UE-to-UE Relay related information may be updated, and in this case, may be transmitted. Also, transmission of the UE-to-UE Relay related information may be determined based on information of FIG. 8, local configuration information, information as to whether UE-to-UE Relay function may be provided and if possible information on a group to which the UE-to-UE Relay function may be provided, load/overload information related to the UE and/or battery residual information. At step S1803, the first UE may recognize that the second UE is suitable as a UE-to-Network Relay and a UE-to-UE Relay, on the basis of the received UE-to-Network Relay discovery response message. At step S1804, the first UE may select the second UE as a UE-to-Network Relay and a UE-to-UE Relay. Afterwards, at step S1805, the first UE may configure one-to-one direct communication connection with the second UE to receive network connection service from the second UE. Details of connection configuration may be understood with reference to 7.1 of TR 23.713 v1.4.0 (Solution for one-to-one ProSe direct communication).

As shown in FIG. 18, the operation for selecting a relay by means of a first UE that has received UE-to-UE Relay related information from a plurality of UEs may be defined as follows.

The first UE may determine whether there is a UE that may provide a UE-to-Network Relay function and a UE-to-UE Relay function most appropriately (or fully) on the basis of UE-to-UE Relay related information, additionally UE-to-Network Relay related information (this may be information on group(s) that may provide a UE-to-Network Relay function). This may be based on whether the UE may join desired group communication through the UE-to-Network Relay and desired communication through the UE-to-UE Relay. If it is determined that there is a UE that may provide the UE-to-Network Relay function and the UE-to-UE Relay function most appropriately (or fully), this UE may be selected as the UE-to-Network Relay and the UE-to-UE Relay. Afterwards, a UE-to-Network Relay request operation and/or a UE-to-UE Relay request operation may be initiated to the Relay UE. If it is determined that there is no UE that may provide the UE-to-Network Relay function and the UE-to-UE Relay function appropriately, a UE that may provide the UE-to-Network Relay function most appropriately (or fully) may be selected as the UE-to-Network Relay. If the selected Relay UE may partially provide the UE-to-UE Relay function, the Relay UE may be selected as one of UE-to-UE Relays. In this case, for communication through a relay with UE(s) or group(s), which cannot be covered by the Relay UE, a procedure of additionally monitoring another UE-to-UE Relay may be performed. If it is determined that there is no UE that may provide the UE-to-Network Relay function and the UE-to-UE Relay function appropriately, a UE that may provide the UE-to-UE Relay function most appropriately (or fully) may be selected as the UE-to-UE Relay. And, a UE that may provide the UE-to-Network Relay function most appropriately (or fully) may be selected as the UE-to-Network Relay.

An operation in case that the first UE receives UE-to-UE Relay related information from one UE may be defined as follows. The UE that has provided the information may determine whether there is a UE that may provide a UE-to-Network Relay function and a UE-to-UE Relay function most appropriately (or fully) on the basis of the received UE-to-UE Relay related information, additionally UE-to-Network Relay related information (this may be information on group(s) that may provide a UE-to-Network Relay function). This may be based on whether the UE may join desired group communication through the UE-to-Network Relay and desired communication through the UE-to-UE Relay. If it is determined that there is a UE that may provide the UE-to-Network Relay function and the UE-to-UE Relay function most appropriately (or fully), this UE may be selected as the UE-to-Network Relay and the UE-to-UE Relay. Afterwards, a UE-to-Network Relay request operation and/or a UE-to-UE Relay request operation may be initiated to the Relay UE. If it is determined that there is no UE that may provide the UE-to-Network Relay function and the UE-to-UE Relay function appropriately, this UE may be selected as the UE-to-Network Relay. If the selected Relay UE may partially provide the UE-to-UE Relay function, the Relay UE may be selected as one of UE-to-UE Relays. In this case, for communication through a relay with UE(s) or group(s), which cannot be covered by the Relay UE, a procedure of additionally monitoring another UE-to-UE Relay may be performed.

Subsequently, the first UE acquires IP address from the second UE at step S1806, and then may request the GCS AS of registration including IP address information. This registration request message may be transferred to the GCS AS on the network through the second UE which is the UE-to-Network Relay, and information included in the registration request message may be recognized by the UE-to-Network Relay and/or transferred to the GCS AS by processing/modification, or by simply performing IP routing role. At step S1807, the GCS AS that has received the registration request message from the first UE may transmit a registration response message to the UE-1.

Since the second UE has been selected as the UE-to-UE Relay, the first UE may perform an operation of establishing connection with the fourth UE through the second UE (S1808).

In the aforementioned description, the order of each step may be modified, and for example, S1808 may be performed prior to or simultaneously with S1806 and S1807.

In the aforementioned description, the case that the UE which monitors the UE-to-Network Relay desires to monitor the UE-to-UE Relay together with the UE-to-Network Relay has been descried. By contrast, the present invention may be applied to the case that the UE which monitors the UE-to-UE Relay desires to monitor the UE-to-Network Relay together with the UE-to-UE Relay.

Embodiment 2

Figure 19:
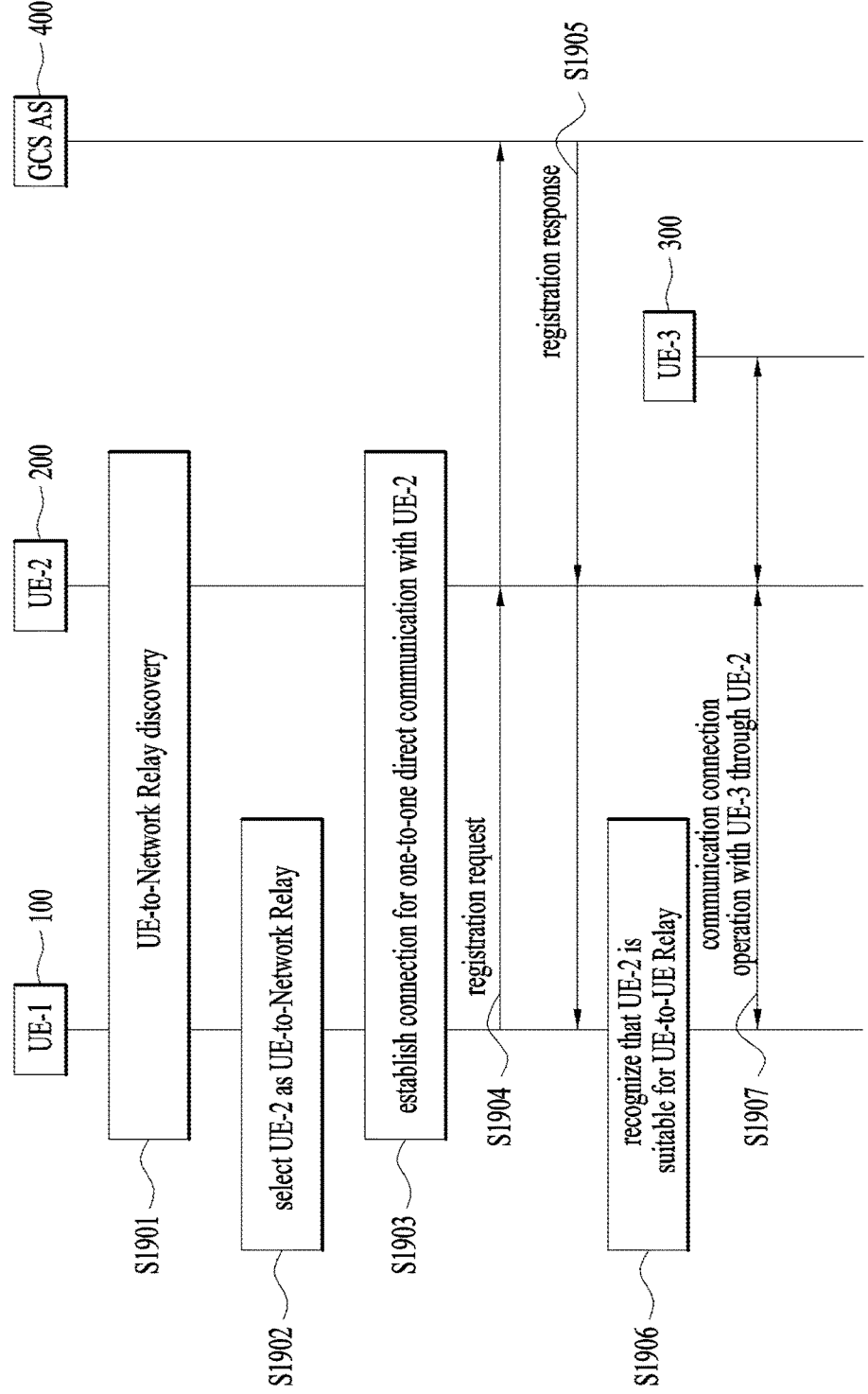

The second embodiment relates to a method for providing UE-to-UE Relay related information from a GCS AS. Referring to FIG. 19, at step S1901, the first UE may transmit a UE-to-Network Relay discovery message. In this case, the first UE is a UE that performs UE-to-Network Relay discovery to receive connection service to a network as the UE desires to get out of E-UTRAN coverage or gets out of E-UTRAN coverage. Also, discovery may be Model A type UE-to-Network Relay discovery or Model B type UE-to-Network Relay discovery.

At step S1902, the first UE may select the second UE as the UE-to-Network Relay.

At step S1903, the first UE may establish one-to-one direct communication connection with the second UE to receive network connection service from the second UE. Details of the connection establishment may be understood with reference to 7.1 of TR 23.713 v1.4.0 (Solution for one-to-one ProSe direct communication).

At step S1904, the first UE may request the GCS AS of registration including IP address information after acquiring IP address from the second UE through the step 3. The first UE includes UE-to-UE Relay related request information in the registration request message to communicate with the third UE. This registration request message may be transferred to the GCS AS on the network through the second UE which is the UE-to-Network Relay, and information included in the registration request message may be recognized by the UE-to-Network Relay and/or transferred to the GCS AS by processing/modification or by simply performing IP routing role.

In this case, the UE-to-UE Relay related request information may mean one or more of information included in the aforementioned Table 8. This information may be provided explicitly or implicitly. Also, this information may be provided in a combination type. Also, this information may be provided in a combined type with information for requesting the UE-to-Network Relay. The UE-to-UE Relay related request information may be transmitted during the procedure of monitoring the UE-to-Network Relay or the procedure of forming one-to-one direct communication connection with the UE-to-Network Relay after selecting/determining the UE-to-Network Relay. The information is finally transferred to the GCS AS.

As described above, the registration procedure performed by transmission of the registration request message may be initial registration and/or periodic registration. Also, the registration procedure may mean the procedure of performing registration to the GCS AS by means of the UE-to-Network Relay instead of the UE. Also, the UE-to-UE Relay related information may be transmitted only if there is update from previous transmission.

At step S1905, the GCS AS which has received the registration request message including the UE-to-UE Relay related request information from the first UE may transmit a registration response message to the first UE together with the UE-to-UE Relay related information. When the UE-to-UE Relay related information is updated, the GCS AS may transmit a message, which includes the update information, to the first UE. In this case, the UE-to-UE Relay related information may be one or more of information included in the following Table 10. Also, the UE-to-UE Relay related information may include information as to whether the information shall be selected, information as to whether the information should be selected (selection is recommended), and information as to whether the information may be selected (determined by the UE).

TABLE 10

Information on UE(s) that receives EPC connectivity through the same UE-to-Network Relay as UE: information on UE(s) that receive EPD connectivity through the same UE-to-Network Relay may be identifier information of UE (this may be Application User ID information and/or identifier information of group to which UE belongs, and/or Layer-2 ID information of UE and/or IP address information of UE). This may equally be applied to information on UE(s). (For reference, as a method for allowing GCS AS to identify UE-to-Network Relay by which a Remote UE is served, the UE-to-Network Relay may use a method for notifying the AS that the UE-to-Network Relay is a relay during the registration procedure of the remote UE as described in step 6 f 6.3.6.2 of TR 23.703v12.0.0 or step 3 of 6.3.7.2.3. However, the present invention is not limited to this method. When UE-to-Network Relay related information should be transmitted to the UE, information on UEs served from the UE-to-Network Relay may be acquired from the UE-to-Network Relay.) - Information on UE(s) which camp on the same cell as that of the UE-to-Network Relay, which serves the UE: the same cell may mean a cell having the same ECGI(E-UTRAN Cell Global Identification), that is, the same PLMN, or may include the same cell although the PLMN is different in case of a shared RAN. (for reference, as a method for allowing GCS AS to identify whether UE(s) registered in the GCS AS has camped on the same cell as that of the UE-to-Network Relay, the GCS AS may acquire cell information of the UE registered in the GCS AS from another

TABLE 10-continued network node (e.g., PCRF, P-GW, etc.). This may include acquisition of
corresponding information even in case of cell change.
However, the present invention is not limited to this case, and when the
UE is registered in the GCS AS (initial registration and/or periodic
registration), information on cell on which the UE has camped may be
included in the corresponding information. Also, whenever the UE
changes the cell on which the UE camps, the UE may perform re-
registration to notify the GCS AS of the cell change.) - Information
on UE(s) which camp on a neighboring cell of a cell on which the
UE-to-Network Relay, which serves the UE, camps: details of this
information applies the above description
ii). - Information on UE(s) which is in proximity relation with the UE-to-
Network Relay that serves UE: this information may be provided from the
UE-to-Network Relay (for example, the UE-to-Network Relay provides
information acquired by directly perform discovery to the GCS AS), or
may be information acquired by the GCS AS through EPC-level ProSe
discovery between UEs registered in the GCS AS and the UE-to-Network
Relay, or may be inferred by the GCS AS through location information
cell information, coordinate information, etc.) of the UEs registered in the
(e.g., GCS AS and the UE-to-Network Relay. The information on UE(s)
having the proximity relation may be added to information on each UE or
replaced with information on each UE to provide information on group to
which the UE belongs. - Information on group(s) in which UE-to-Network
Relay, which serves UE, can provide UE-to-Network Relay function: this
information may be provided from the UE-to-Network Relay, or may be
information acquired by the GCS AS from another network node. -
information indicating that a UE-to-Network Relay which serves UE may
be selected as the UE-to-UE relay: the information may include
information as to whether the information shall be selected, information
as to whether the information should be selected (selection is
recommended), and information as to whether the information may be
selected (determined by the UE).

When the information of Table 10 provides information on UE(s) and/or group(s), the information may include only information on UE(s) belonging to the same group as that of the UE (that is, UE which receives information) or not. Particularly, if the UE transmits information on group(s) which become(s) target(s) for communication through the UE-to-UE Relay, the GCS AS may include only information on UE(s) belonging to the group(s). Also, this may include only information on group(s) accepted or authorized to perform communication with the UE (that is, UE which receives information), or not. Also, this may include only information on UE(s) accepted or authorized to perform communication with the UE (that is, UE which receives information), or not. Also, if the first UE transmits information on UE(s) which become(s) target(s) for communication through the UE-to-UE Relay, the GCS AS may include only information on UE(s) which become(s) target(s). That is, the GCS AS may transmit the UE-to-UE Relay related information to the UE and/or the UE-to-Network Relay during the procedure of responding to the registration, and if there is update, may transmit the updated information. Meanwhile, the UE-to-UE Relay related information may be included in USD when the GCS AS transmits USD to the remote UE and/or the UE-to-Network Relay.

Also, transmission of the UE-to-UE Relay related information may be determined based on information of FIG. 8, subscriber information of the UE that has transmitted the UE-to-UE Relay related request information, local configuration information, information as to whether the UE-to-Network Relay, which serves the UE, may provide UE-to-UE Relay function (this may be received from the UE-to-Network Relay, or may be identified based on subscriber information of the Relay UE), information on a group to which the UE-to-UE Relay function may be provided by the UE-to-Network Relay, load/overload information related to a relay function of the UE-to-Network Relay, which serves the UE that has transmitted the UE-to-UE Relay related request information, and battery residual information of the UE-to-Network Relay which serves the UE that has transmitted the UE-to-UE Relay related request information.

At step S1906, the first UE may recognize/determine that the second UE may provide UE-to-UE Relay service for communication with the third UE, on the basis of the UE-to-UE Relay related information included in the received registration response message. At step S1907, the first UE may perform the operation for establishing connection with the third UE through the second UE. That is, the UE which has received the UE-to-UE Relay related information from the GCS AS may perform one or more of the following operations. The UE may determine whether the UE-to-Network Relay which serves the UE may provide desired communication through the UE-to-UE Relay. If it is determined that the UE-to-Network Relay which serves the UE is suitable as the UE-to-UE Relay, the UE may determine the UE-to-Network Relay as the UE-to-UE Relay. Afterwards, the UE-to-UE Relay request operation may be initiated to the Relay UE. If it is determined that the UE-to-Network Relay which serves the UE is not suitable as the UE-to-UE Relay, the UE may perform the operation for monitoring/selecting the UE-to-UE Relay. If it is determined that the UE-to-Network Relay which serves the UE is not suitable as the UE-to-UE Relay, the UE may perform the operation for re-monitoring/re-selecting the UE-to-Network Relay. At this time, the UE may perform the operation for re-monitoring/re-selecting the UE-to-Network Relay while continuously receiving service from the existing UE-to-Network Relay.

Embodiment 3

The embodiment 3 is a combined type of the embodiment 1 and the embodiment 2. According to the embodiment 3, a transmission entity of the UE-to-UE Relay related information is dependently determined in accordance with UE-to-UE Relay related request information. In more detail, the first UE may transmit a UE-to-Network Relay discovery message and select the second UE as the UE-to-Network Relay. The first UE may establish connection for direct communication with the second UE and transmit a registration request message to a GCS AS (Group Communication Service Application Server) through the second UE. In response to the registration request message, the first UE may receive a registration response message and establish connection with the UE determined based on UE-to-UE Relay related information. In this case, if the UE-to-Network Relay discovery message includes UE-to-UE Relay related request information, the first UE may receive UE-to-UE Relay related information (included in the UE-to-Network Relay discover response) from the second UE and select the second UE as the UE-to-UE Relay on the basis of the UE-to-UE Relay related information. Alternatively, if the registration request message includes UE-to-UE Relay related request information, the first UE may receive UE-to-UE Relay related information from the GCS AS (the UE-to-UE Relay related information is included in the registration response message) and select the second UE as the UE-to-UE Relay on the basis of the UE-to-UE Relay related information.

Since each step in the embodiment 3 is the same as the description of the embodiment 1 and the embodiment 2, detailed description of each step in the embodiment 3 will be omitted.

The aforementioned embodiments have been described based on the case that the UE which monitors the UE-to-Network Relay desires to monitor the UE-to-UE Relay together with the UE-to-Network Relay but may be applied to the case that the UE which monitors the UE-to-UE Relay desires to monitor the UE-to-Network Relay together with the UE-to-UE Relay. Also, the embodiments may be applied to whole UMTS/EPS mobile communication systems including 3GPP access network (e.g., UTRAN/GERAN/E-UTRAN) and non-3GPP access network (e.g., WLAN) without limitation to the LTE/EPC network. Also, the embodiments may be applied to all other wireless mobile communication systems in an environment that network control is applied.

Figure 20:
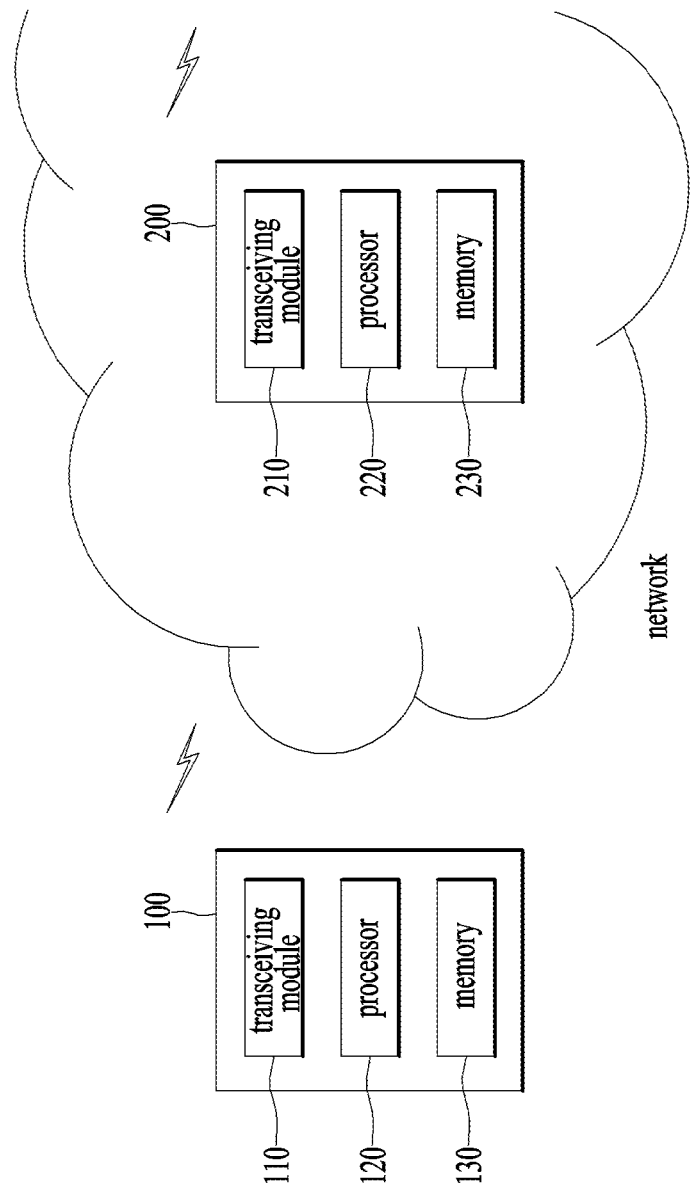
FIG. 20 is a diagram illustrating a configuration of a node device according to one embodiment of the present invention.

FIG. 20 is a diagram illustrating configurations of a UE and a network node device according to the embodiment of the present invention.

Referring to FIG. 20, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 20, the network node device 200 according to the present invention may include a transceiving module 210, a processor 220, and a memory 230. The transceiving module 210 may be configured to transmit various signals, data and information to an external device and to receive various signals, data and information from the external device. The network node device 200 may be connected with the external device through the wire and/or wireless. The processor 220 may control the overall operation of the network node device 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node device 200 may be configured in such a manner that the aforementioned various embodiments of the present invention may independently be applied to the aforementioned UE 100 and the aforementioned network node device 200, or two or more embodiments may simultaneously be applied to the aforementioned UE 100 and the aforementioned network node device 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may be applied to various mobile communication systems.

The invention claimed is:

1. A method of selecting, by a first user equipment (UE), a relay in a proximity service (ProSe) in a wireless communication system, the method comprising:
   transmitting a UE-to-Network Relay discovery message;
   selecting a second UE as a UE-to-Network Relay;
   establishing a connection for direct communication with the second UE; and
   transmitting a registration request message to a group communication service application server (GCS AS) through the second UE,
   wherein when the UE-to-Network Relay discovery message includes UE-to-UE Relay related request information, UE-to-UE Relay related information is received from the second UE and the second UE is selected as a UE-to-UE Relay based on the UE-to-UE relay related information, and
   wherein when the registration request message includes the UE-to-UE Relay related request information, the UE-to-UE Relay related information is received from the GCS AS, and the second UE is selected as the UE-to-UE Relay on the basis of the UE-to-UE Relay related information.

2. The method according to claim 1, wherein the first UE is located outside coverage.

3. The method according to claim 1, wherein the UE-to-UE Relay related information includes one or more of information indicating that the UE-to-UE Relay shall be selected, information indicating that communication will be performed through the UE-to-UE Relay, information indicating information required to select/determine the UE-to-UE Relay is requested, information on a UE which becomes a target for communication through the UE-to-UE Relay, and information on a group which becomes a target for communication through the UE-to-UE Relay.

4. The method according to claim 1, wherein the UE-to-UE Relay related information received from the second UE includes one or more of information on a UE to which the second UE currently provides a UE-to-Network Relay, information on a UE having a proximity relation with the second UE, information on a group to which the second UE may provide a UE-to-UE Relay function, and information indicating that the second UE may be selected as the UE-to-UE Relay.

5. The method according to claim 1, wherein the UE-to-UE Relay related information received from the GCS AS includes one or more of information on a UE that receives evolved packet core (EPC) connectivity through the same UE-to-Network Relay as the first UE, information on a UE which camps on the same cell as that of the UE-to-Network Relay which serves the first UE, information on a UE which camps on a neighboring cell of the cell camped on by the UE-to-Network Relay which serves the first UE, and information on a UE having a proximity relation with the second UE.

6. The method according to claim 1, wherein, if the UE-to-Network Relay discovery message includes UE-to-UE Relay related request information, the UE-to-UE Relay related information is included in a UE-to-Network Relay discovery response.

7. The method according to claim 1, wherein, if the registration request message includes UE-to-UE Relay related request information, the UE-to-UE Relay related information is included in a registration response message.

8. The method according to claim 1, further comprising:
receiving a registration response message in response to a response to the registration request message; and
establishing the connection with the second UE determined based on the UE-to-UE Relay related information.

9. The method according to claim 1, wherein the UE-to-Network Relay discovery message is one of an announcement message or a solicitation message.

10. The method according to claim 1, wherein the UE-to-Network Relay discovery message is a PC5-D message.

11. A proximity service (ProSe) user equipment (UE) for selecting a relay in a wireless communication system, the ProSe UE comprising:
a transceiver; and
a processor,
wherein the processor transmits a UE-to-Network Relay discovery message, selects a second UE as a UE-to-Network Relay, establishes a connection for direct communication with the second UE, and transmits a registration request message to a group communication service application server (GCS AS) through the second UE,
wherein when the UE-to-Network Relay discovery message includes UE-to-UE Relay related request information, UE-to-UE Relay related information is received from the second UE and the second UE is selected as a UE-to-UE Relay based on the UE-to-UE relay related information, and
wherein when the registration request message includes the UE-to-UE Relay related request information, the UE-to-UE Relay related information is received from the GCS AS, and the second UE is selected as the UE-to-UE Relay on the basis of the UE-to-UE Relay related information.

\* \* \* \* \*